(12) United States Patent
Ishikawa (10) Patent No.: US 6,201,896 B1
(45) Date of Patent: Mar. 13, 2001

(54) PICTURE ENCODING APPARATUS

(75) Inventor: Hiroyuki Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/208,846

(22) Filed: Dec. 10, 1998

(30) Foreign Application Priority Data

Dec. 10, 1997 (JP) .................................................. 9-339918

(51) Int. Cl.[7] .................................................... G06K 9/36
(52) U.S. Cl. .......................... 382/236; 382/232; 382/246
(58) Field of Search ................................... 382/236, 232, 382/238, 246; 348/15; 370/484

(56) References Cited

U.S. PATENT DOCUMENTS

| 6,097,737 | * | 8/2000 | Takizawa et al. | 370/484 |
| 6,108,027 | * | 8/2000 | Andrews et al. | 348/15 |

FOREIGN PATENT DOCUMENTS

| 2 260 668 | 4/1993 | (GB) | H04N/7/133 |
| 1-93278 | 4/1989 | (JP) | H04N/7/13 |
| 4-344771 | 12/1992 | (JP) | H04N/1/41 |
| 8-242446 | 9/1996 | (JP) | H04N/7/24 |

* cited by examiner

*Primary Examiner*—Jose L. Couso
*Assistant Examiner*—Anh Hong Do
(74) *Attorney, Agent, or Firm*—Foley & Lardner (57) ABSTRACT

In a picture encoding apparatus, block type determining means 22 judges whether a frame rate is lower than a threshold value A, and compares a block moving amount with a threshold value B when the frame rate is lower than the threshold value A. If the block moving amount is larger than the threshold value B, the current block is determined as a block to be compressed in a high picture-quality mode. Further, the differential value between the current block and a reference block is calculated, and the value of the high frequency component of the differential block is compared with a threshold value C. If it is larger than the threshold value C, the block is judged as a block to be compressed in the high picture-quality mode. Data amount assignment means 23 generates a quantization scale factor to assign a data amount to each block in accordance with the block type determined by the block type determining means 22, and then supplies the quantization scale factor to quantizing means 24.

12 Claims, 8 Drawing Sheets

REFERENCE FRAME

FIG. 6B

CURRENT FRAME

| 210 | 212 | 286 | 366 | 452 | 811 | 265 | 241 | 233 |
|-----|-----|-----|-----|-----|-----|-----|-----|-----|
| 241 | 233 | 352 | 929 | 1023| 481 | 278 | 236 | 241 |
| 236 | 247 | 1010| 512 | 1245| 365 | 289 | 257 | 222 |
| 229 | 230 | 415 | 1157| 1401| 440 | 243 | 221 | 185 |
| 235 | 312 | 923 | 1029| 488 | 439 | 256 | 179 | 157 |
| 247 | 684 | 861 | 1092| 365 | 223 | 245 | 198 | 158 |

DISTRIBUTION OF AC POWER

FIG. 7B

| 10 | 10 | 10 | 10 | 10 | 10 | 10 | 10 | 10 |
|----|----|----|----|----|----|----|----|----|
| 10 | 10 | 10 | 10 | 10 | 10 | 10 | 10 | 10 |
| 10 | 10 | 10 | 10 | 10 | 10 | 10 | 10 | 10 |
| 10 | 10 | 10 | 10 | 10 | 10 | 10 | 10 | 10 |
| 10 | 10 | 10 | 10 | 10 | 10 | 10 | 10 | 10 |
| 10 | 10 | 10 | 10 | 10 | 10 | 10 | 10 | 10 |

INITIAL VALUE OF DATA ASSIGNMENT AMOUNT

FIG. 7C

| 8 | 8  | 8  | 9  | 10 | 14 | 8 | 8 | 8 |
|---|----|----|----|----|----|---|---|---|
| 8 | 8  | 9  | 15 | 16 | 10 | 8 | 8 | 8 |
| 8 | 8  | 16 | 11 | 18 | 9  | 8 | 8 | 8 |
| 8 | 8  | 10 | 17 | 20 | 10 | 8 | 8 | 7 |
| 8 | 9  | 15 | 16 | 10 | 10 | 8 | 7 | 7 |
| 8 | 12 | 14 | 16 | 9  | 8  | 8 | 7 | 7 |

ASSIGNMENT OF DATA AMOUNT BASED ON AC POWER

FIG. 7D

| 5 | 5  | 6  | 7  | 8  | 21 | 6 | 6 | 6 |
|---|----|----|----|----|----|---|---|---|
| 5 | 6  | 7  | 22 | 24 | 8  | 6 | 6 | 5 |
| 6 | 6  | 24 | 9  | 27 | 7  | 6 | 6 | 5 |
| 6 | 6  | 8  | 25 | 30 | 8  | 6 | 5 | 5 |
| 6 | 7  | 22 | 24 | 8  | 8  | 5 | 5 | 5 |
| 6 | 18 | 21 | 24 | 7  | 6  | 5 | 5 | 4 |

ASSIGNMENT OF DATA AMOUNT BASED ON COMPRESSION MODE

FIG. 8A

| 16 | 16 | 16 | 16 | 16 | 16 | 16 | 16 | 16 |
|----|----|----|----|----|----|----|----|----|
| 16 | 16 | 16 | 16 | 16 | 16 | 16 | 16 |  |
| 16 | 16 | 16 | 16 | 16 | 16 | 16 | 16 |  |
| 16 | 16 | 16 | 16 | 16 | 16 | 16 | 16 |  |
| 16 | 16 | 16 | 16 | 16 | 16 | 16 | 16 |  |
| 16 | 16 | 16 | 16 | 16 | 16 | 16 | 16 |  |

INITIAL VALUE OF QUANTIZATION SCALE FACTOR

FIG. 8B

| 18 | 18 | 18 | 18 | 18 | 10 | 18 | 18 | 18 |
|----|----|----|----|----|----|----|----|----|
| 18 | 18 | 18 | 10 | 10 | 18 | 18 | 18 | 18 |
| 18 | 18 | 10 | 18 | 10 | 18 | 18 | 18 | 18 |
| 18 | 18 | 18 | 10 | 10 | 18 | 18 | 18 | 18 |
| 18 | 18 | 10 | 10 | 18 | 18 | 18 | 18 | 18 |
| 18 | 10 | 10 | 10 | 18 | 18 | 18 | 18 | 18 |

CHANGE OF QUANTIZATION SCALE FACTOR BASED ON COMPRESSION MODE

PICTURE ENCODING APPARATUS

BACKGROUND OF THE INVENTION

1. Field of the Invention

The present invention relates to a picture encoding apparatus and more particularly, to a picture encoding apparatus for compressing video signals on a real-time basis.

2. Description of the Prior Art

When pictures/voices are transmitted/received by using a telephone line or a digital line as in the case of a videophone, a system in which data are compressed and transmitted in conformity with transmission performance of the line and the data thus transmitted are expanded at a reception side is generally used.

Figure 9:
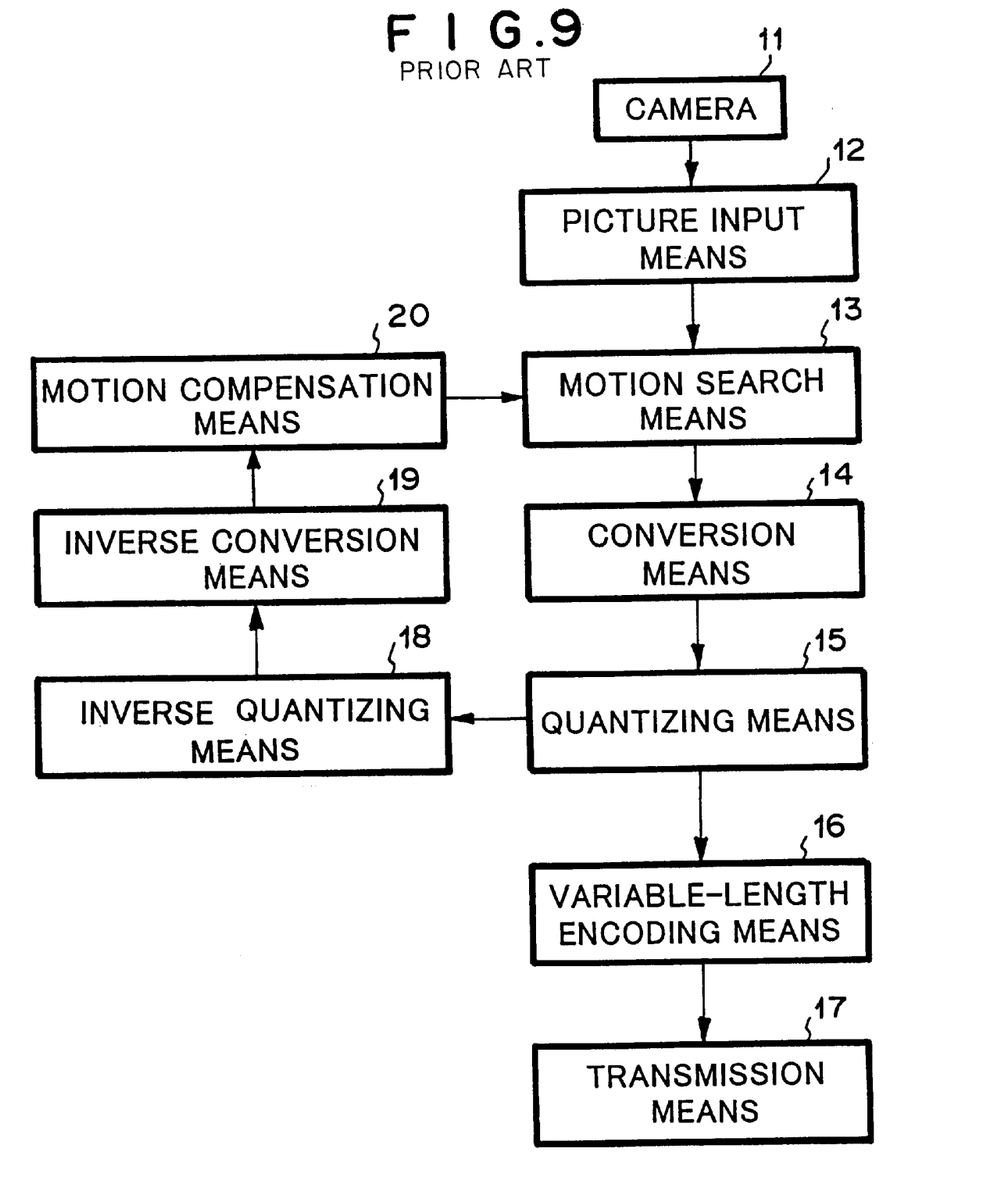
FIG. 9 is a block diagram showing a conventional picture encoding apparatus.

FIG. 9 is a block diagram showing a conventional picture compression apparatus.

In FIG. 9, a video signal of a subject which is picked up by camera 11 is supplied to picture input means 12 and then divided into plural blocks. A block having high correlation with reference picture data is searched every block by motion detection means 13, and the differential between the block thus searched and the current block is calculated. The differential data are converted to frequency components in conversion means 14, and then quantized in quantizer 15.

The quantized data outputted from quantizer 15 are inversely quantized in inverse quantizer 18, and then supplied to inverse conversion means 19 to be converted from the frequency components to pixel values. Thereafter, the differential data are restored to reference picture data in motion compensation means 20, and then supplied to motion search means 13. On the other hand, the quantized data are supplied to variable-length encoding means 16 to be subjected to variable-length encoding on the basis of run length or the like, and then transmitted to transmission path by transmission means 17.

In order to enhance the picture quality when the above picture compression processing is carried out under such a condition that the transmission performance of the line is restricted, there is known a method of increasing the data amount per one frame. However, if a large data amount is allocated to one frame, it takes a long time to complete the transmission of the frame, and thus a time interval until the data of a next frame are compressed is increased. As the time interval is increased, intermittent moving pictures are obtained (i.e., moving pictures obtained are as if some frames thereof are intermittently missed (hereinafter referred to as "frame-missed moving pictures").

On the other hand, if the data amount per one frame is reduced, the time interval until a next frame becomes shorter, and thus the motion becomes smoother. However, since the data amount per frame is small, block-shaped noises appear in pictures, resulting in degradation of picture quality.

Therefore, when the video data are transmitted through a line having low transmission performance, frame-missed moving pictures are transmitted or the picture quality is extremely degraded.

In order to avoid this phenomenon, it is required to improve the allocation of the data amount within one frame without increasing the data amount to be allocated to one frame and allocate a large data amount to portions to which viewers pay their attention.

Therefore, an apparatus which samples a picture of one frame and uses the correlation between adjacent pixels has been hitherto known as a picture encoding apparatus which enhances the picture compression efficiency as disclosed, for example, in JPA-8-242446. Further, there has been also known a picture encoding apparatus in which a still picture is sectioned into plural blocks and the fineness of gradation is adaptively varied every block to perform the optimum compression as disclosed, for example, in JPA-1-93278. Still further, there has been hitherto known a picture encoding apparatus in which the correlation between blocks is examined when a still picture is compressed and a high-correlation block are approximated by a preceding block as disclosed, for example, JPA-4-344771.

These conventional picture encoding apparatuses take no account of successive pictures or the enhancement in picture quality for the frame-missed moving pictures, and thus degradation of picture quality becomes remarkable when compressed pictures are intermittent. Further, in the conventional apparatus disclosed in JPA-8-242446, the data amount to be allocated to one frame is not taken into consideration, and a dedicated expanding apparatus must be provided to an expansion side.

In JPA-1-93278, there is no mention of the support of moving pictures, and also the data amount to be allocated to one frame is not taken into consideration. Further, in JPA-4-344771, a support of moving pictures is not taken into consideration, and also there is no mention of enhancement of picture quality.

SUMMARY OF THE INVENTION

In order to overcome the aforementioned disadvantages, the present invention has made and accordingly has an object to provide a picture encoding apparatus for performing data compression which reduces noises which are liable to attract viewer's attention when the number of the frames of compressed pictures to be transmitted per unit time is small due to the restriction of the transmission performance, whereby high-quality pictures can be obtained with no alteration of programs at an expansion side.

According to the present invention, there is provided a picture encoding apparatus for performing motion-compensated intra-frame picture coding on a block basis, which comprises: block data generating means for generating data of each block in a current frame from data in the current frame and data in a reference frame and a motion vector for each block by using motion-compensated prediction; a quantizer for quantizing data of each block in the current frame in accordance with a quantization scale factor; block type determining means for determining whether a mode of each block in the current frame is high-quality mode or normal mode on the basis of an interval between the current frame and the reference frame, a quantity of the motion vector of each block in the current frame, and an activity of each block in the current frame; data amount assignment means for determining the quantization scale factor for each block in the current frame on the basis of the mode of each block so that data amount of the output of the quantizer for each block is varied in accordance with the mode of each block; and variable-length encoding means for encoding the output of the quantizer into variable-length code; and reference frame data generating means for generating the data in the reference frame using the output of the quantizer.

DETAILED DESCRIPTION OF THE PREFERRED EMBODIMENT

A preferred embodiment according to the present invention will be explained hereunder with reference to the accompanying drawings.

Figure 1:
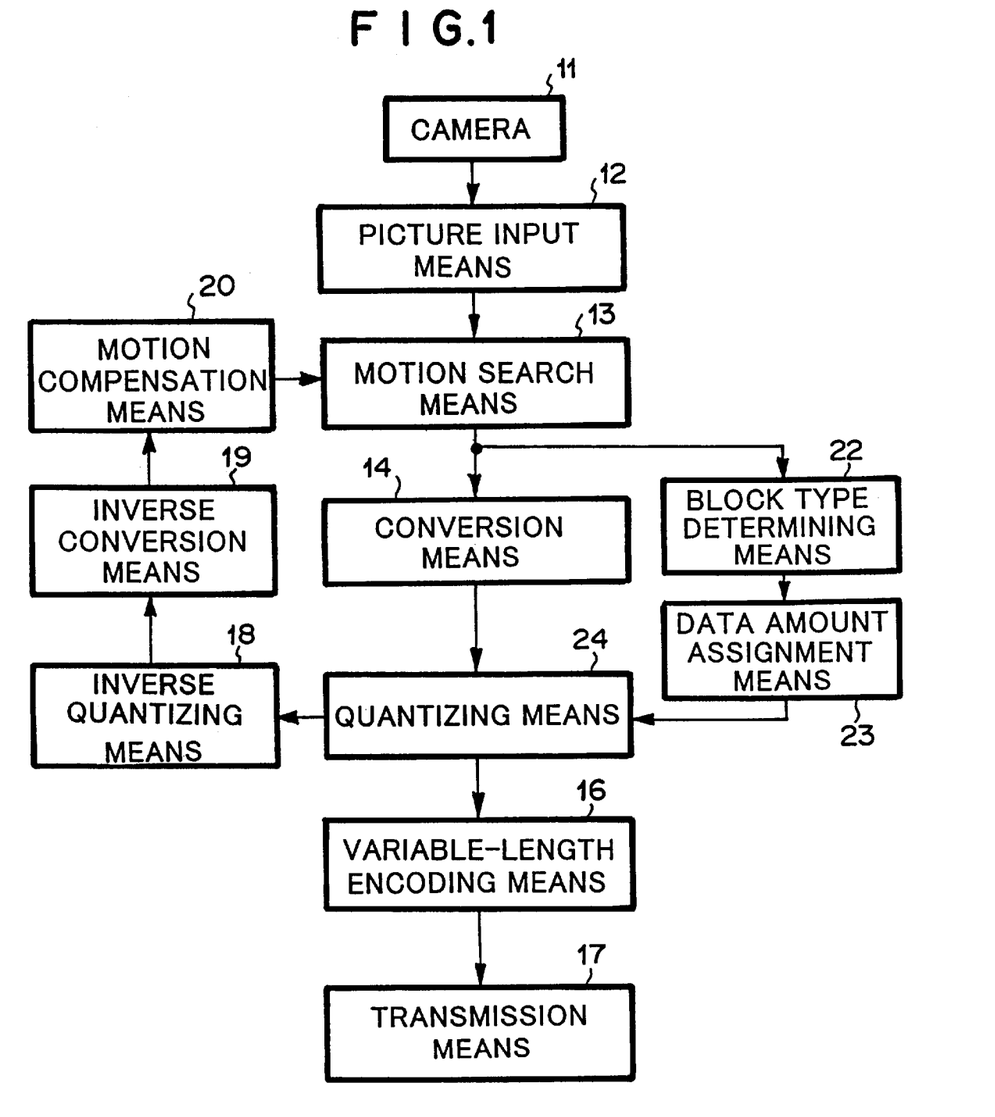
FIG. 1 is a block diagram showing a picture encoding apparatus according to embodiment of the present invention.

FIG. 1 is a block diagram showing the best mode of a picture encoding apparatus. In FIG. 1, the same elements as FIG. 9 are represented by the same reference numerals.

The mode shown in FIG. 1 is characterized in that block type determining means 22 for determining a compression pattern (block type) of each block and data amount assigning means 23 for assigning the data amount corresponding to the block type are provided in a picture encoding apparatus which comprises camera 11 for inputting a video signal, picture input means 12 for dividing video data into plural blocks, motion search means 13 for determining the correlation between the input video data and a video signal of a preceding frame (reference data) every block, conversion means 14 for converting the output data of motion search means 13 to frequency components, quantizer 24 for performing quantization processing, variable-length encoding means 16 for performing variable-length encoding processing, transmission means 17 for transmitting coded data, inverse quantizing means 18 for performing inverse quantization processing, inverse conversion means 19 for converting the frequency components to pixel values and motion compensation means 20 for adding a differential block to the reference data.

Figure 2:
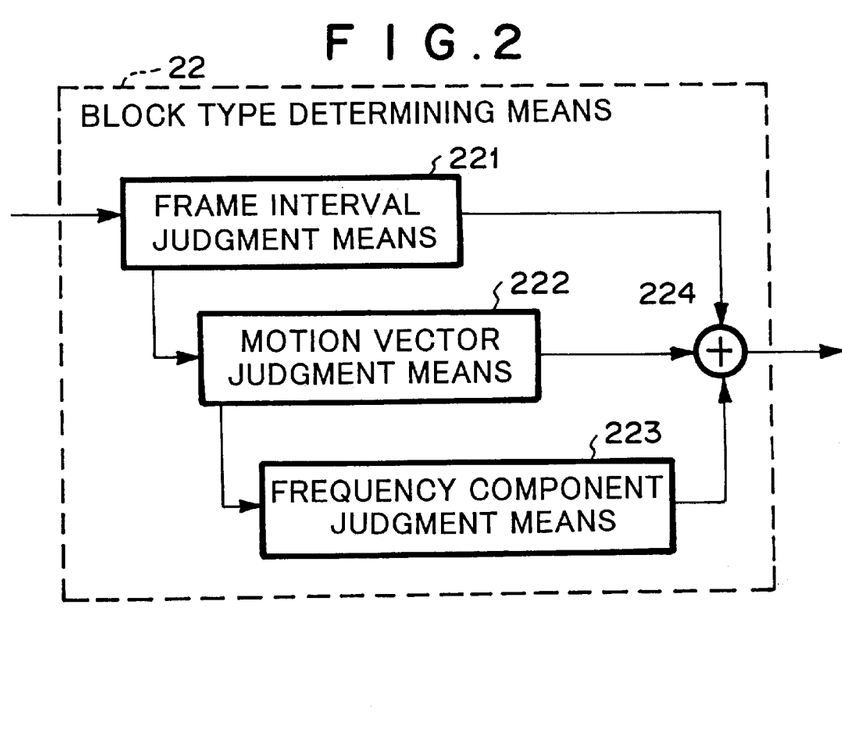
FIG. 2 is a block diagram showing block type determining means which is a main part of FIG. 1.

FIG. 2 is a block diagram showing an example of block type determining means 22. As shown in FIG. 2, block type determining means 22 comprises frame interval judgment means 221 for judging the interval of a preceding frame and a current frame, motion vector judgment means 222 for judging a movement amount of each block, i.e. a quantity of a motion vector of each block, and frequency component judging means 223 for judging a magnitude of high frequency components of each block, i.e. an activity of each block.

In the picture encoding apparatus of FIG. 1, video signal inputted from camera 11 is supplied to motion search means 13 by picture input means 12, and then block type determining means 22 determines the compression pattern of each block on the basis of the motion search result. Thereafter, the conversion to the frequency component is performed by conversion means 14, and then the quantization is performed in the format of the compression pattern by quantizing means 24. Further, the variable-length encoding is carried out by variable-length encoding means 16 to obtain a compressed code, and then the compressed code thus obtained is transmitted through transmission means 17. Quantizing means 24 quantizes the data of the block supplied from conversion means 14 in accordance with the quantization scale factor supplied from data amount assignment means 23.

Further, in order to prepare a reference frame for next frame compression, the data quantized by quantizing means 24 are supplied to inverse quantizer 18 to be inversely quantized, and then the frequency components are converted to pixel components by inverse conversion means 19, and further the data of the reference frame are generated by motion compensation means 20.

As explained later, block type determining means 22 shown in FIG. 2 determines the block type (i.e., whether the block concerned is to be compressed in a high picture-quality mode or in a normal mode in order to perform the processing of improving the picture quality when the frame rate is low, particularly the picture quality of a picture portion which moves at a prescribed or higher speed. Block type determining means 22 judges through frame interval judgment means 221 the frame interval between the video data inputted from motion search means 13 shown in FIG. 1 and the preceding frame. The movement amount of the block is judged by motion vector judgment means 222 when the frame interval is longer than a reference value, while the distribution of the high frequency components is judged by frequency component judgment means 223 when the movement amount is shorter. The output judgment result of each of the judgment means 221, 222 and 223 is outputted through adder 224 to quantizer 24 shown in FIG. 1.

Next, the operation of the mode shown in FIGS. 1 and 2 will be explained with reference to the flowchart of FIG. 3.

In FIG. 1, the video signal of a subject which is picked up by camera 11 is supplied to picture input means 12 to be converted to digital signals, and then divided into plural blocks. A block having high correlation with the reference picture data from motion compensation means 20 is search on a block basis in motion search means 13 (in step 31 of FIG. 3). For example, the sum of squares of differential values of the respective pixels or the sum of absolute values of the differential values are calculated, and the portion having the minimum sum within the search range is set as the position of the reference block.

The search result is supplied to conversion means 14, and also supplied to block type determining means 22 shown in FIGS. 1 and 2. In block type determining means 22, it is determined whether the compression pattern mode of the block is to be the high picture-quality mode or the normal mode. That is, block type determining means 22 first compares the frame interval between the reference frame and the frame containing the current block with a threshold value A by frame interval judgment means 221 of FIG. 2 (step 32 of FIG. 3). In such a system that only a small number of frames are compressed within a unit time like a videophone, this step 32 may be omitted. The threshold value A and threshold values B and C explained later are varied in accordance with the apparatus, and they are set so that the picture quality and the data amount may be optimum.

When the frame interval between the reference frame and the frame containing the current block is below the threshold value A (when the reference frame is not apart from the frame containing the current block by an amount larger than the threshold value A), it means that the frame rate is equal to or higher than the value associated with the threshold value A, and thus the current block is determined as the block which is to be processed in the normal compression mode as in the case of the prior art (step 36 of FIG. 3).

Figure 3:
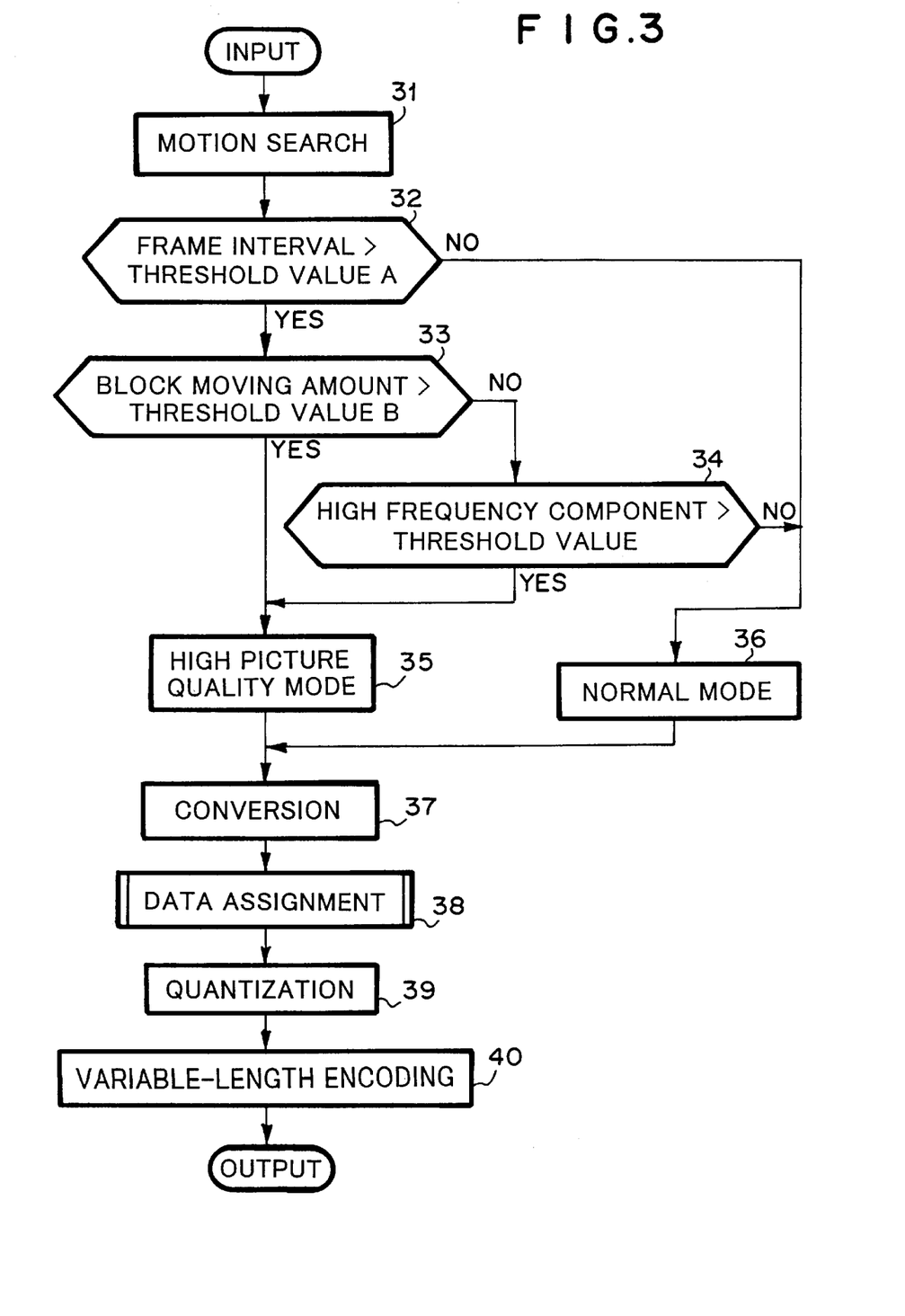
FIG. 3 is a flowchart showing the operation the picture encoding apparatus according to the embodiment of the present invention.

On the other hand, when the frame interval is larger than the threshold value A, it means that the frame rate is lower than the value associated with the threshold value A, and thus the distance between the current block and the reference block (that is, the block movement amount) is compared with the threshold B by motion vector judgment means 222 of FIG. 2 (step 33 of FIG. 3).

When the block movement amount is larger than the threshold value B, the block is judged to be a block moving at a speed above a reference speed associated with the threshold value B and as a part of a moving body at which a visual point is turned, and thus it is determined as a block to be compressed in the high picture-quality mode to enhance the picture quality (step 35 of FIG. 3). On the other hand, when the block movement amount is below the threshold value B, the difference between the reference block and the current block is calculated by frequency component judgment means 223 of FIG. 2 to generate a differential block for which one or more high-frequency components are calculated, and the values of one or more high-frequency components of the differential block are compared with the threshold value C (step 34 of FIG. 3).

The values of the high frequency components are indices representing fineness of the picture of the block. When they are larger than the threshold value C, this block is determined to be a block to be compressed in the high picture-quality mode because a fine picture is conspicuous when a frame rate is low (step 35 of FIG. 3). If not so, the block is determined to be a block to be compressed in the normal mode (step 36 of FIG. 3).

On the other hand, the output video data of motion search means 13 of FIG. 1 are supplied to conversion means 14 to be converted to the frequency components (step 37 of FIG. 3). The data of the block type (compression pattern) which is determined every block by block type determining means 22 are supplied to data amount assignment means 23 of FIG. 2. Data amount assignment means 23 generates quantization scale factor suitable for assigning the data amount corresponding to the block type every block, and the quantization scale factor is supplied to quantizing means 24 (step 38 of FIG. 3).

Quantizing means 24 of FIG. 1 quantizes the frequency components supplied from conversion means 14 on the basis of the quantization scale factor supplied from data amount assignment means 23 so as to have the assigned data amount (step 39 of FIG. 3). The quantized data outputted from quantizing means 24 are supplied to variable-length encoding means 16 to be subjected to the variable-length encoding on the basis of the run length or the like (step 40 of FIG. 3), and then the code thus obtained are transmitted to the transmission path by transmission means 17.

Figure 4:
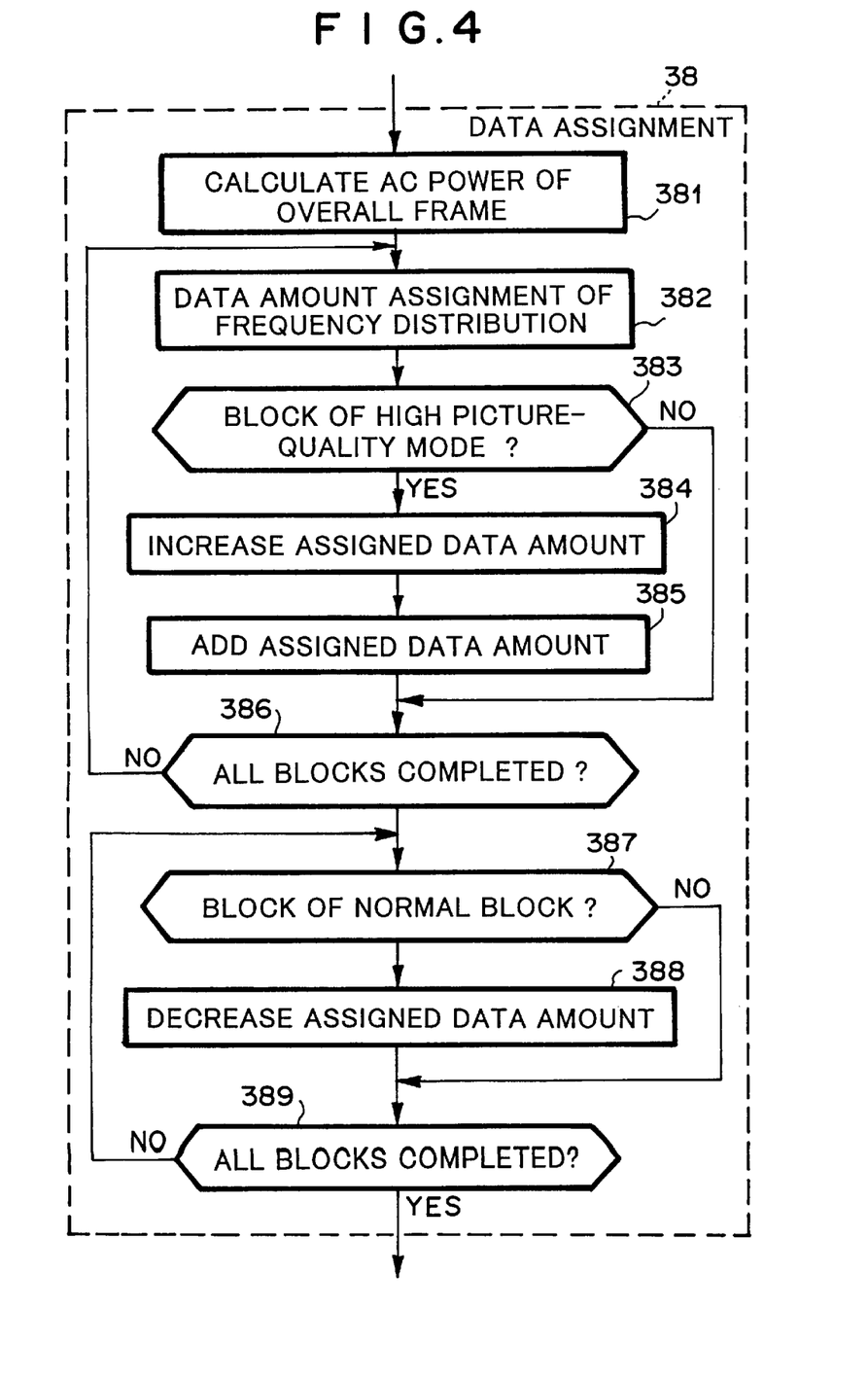
FIG. 4 is a flowchart showing the details of a data amount assigning step of FIG. 3.

The data amount assigning processing by data amount assignment means 23 in the step 38 of FIG. 3 will be explained in more detail with reference to the flowchart of FIG. 4.

When block data which have been converted to the frequency components are inputted, the sum of the absolute values (hereinafter referred to as "AC power") of the components (hereinafter referred to as "AC components") from which the lowest frequency component is excluded in the block data is calculated, and the total of the sums taken for the overall frame is calculated (step 381).

Next, the data amount is distributed proportionally the rate of the AC power (frequency distribution) of each block to the AC power of the overall frame (step 382). Subsequently, is judged whether the current block is in the high picture-quality mode (step 383). If the current block is in the high picture-quality mode, the assigned data amount is increased (step 384), and the total of the data amount after the increase is calculated (step 385).

Subsequently, it is judged whether the adjustment for all the blocks is terminated (step 386). If it is not terminated, the processing on a next block is started from the data amount assignment processing of the step 382. If the normal mode is judged in the step 383, the processing of the steps 384 and 385 is not carried out, and the processing skips to the step 386 to judge whether the adjustment of all the blocks is terminated.

After the processing from the step 382 to the step 386 has been carried out for all the blocks, it is judged whether the current block is a block in the normal mode (step 387). If it is judged as a normal-mode block, the data amount obtained by excluding the data amount assigned to the high picture quality mode from the data amount assigned to the current block is proportionally distributed on the basis of the frequency distribution (step 388). The processing from the step 387 to the step 388 is carried out until the processing on all the blocks is terminated (step 389), and the residual data amount is assigned to the normal-mode blocks, thereby terminating the assignment of the data amount.

As explained above, according to this mode, among the video data in a frame whose frame interval is longer than the threshold value A or the frame rate is low, a block having a moving speed higher than the value associated with the threshold value B is compressed in the high picture-quality mode to increase the data amount to be assigned thereto, and also a block whose moving speed thereof is lower and which is meanwhile finer than the value associated with the threshold value C is also compressed in the high picture-quality mode to increase the data amount to be assigned thereto. Therefore, the picture quality of the picture portion to which viewers pay their attention can be enhanced.

Next, an example of the present invention will be explained with reference to the accompanying drawings.

When the transmission capability of a line is low and a frame rate, i.e., the number of frames of pictures transmitted per unit time, is small as in the case of a videophone, frame missing occurs more frequently as compared with the case where the frame rate is high, and thus degradation of picture quality is more remarkable due to the frame missing. Therefore, it is necessary to perform a proper picture-quality enhancing processing when the frame rate is low.

For example, in the case of transmitting compressed pictures through a line having a transmission rate of 18 KBPS and the frame rate of transmitted pictures is 30 frames per second and further all of the 30 frames are compressed, the data amount assigned to each frame is equal to 600 bits $(=(1/30) \times 18 \times 10^3$ bits).

However, assuming that the good picture quality cannot be obtained by the above data amount, it is necessary to increase the data amount per frame by reducing the frame rate. Therefore, there will be explained such a case that a frame rate is set to 6 frames per second at which no problem is practically caused for a videophone. In this case, the data amount assigned to a frame is equal to 3 Kbits, resulting in enhancement in picture quality.

Figure 5:
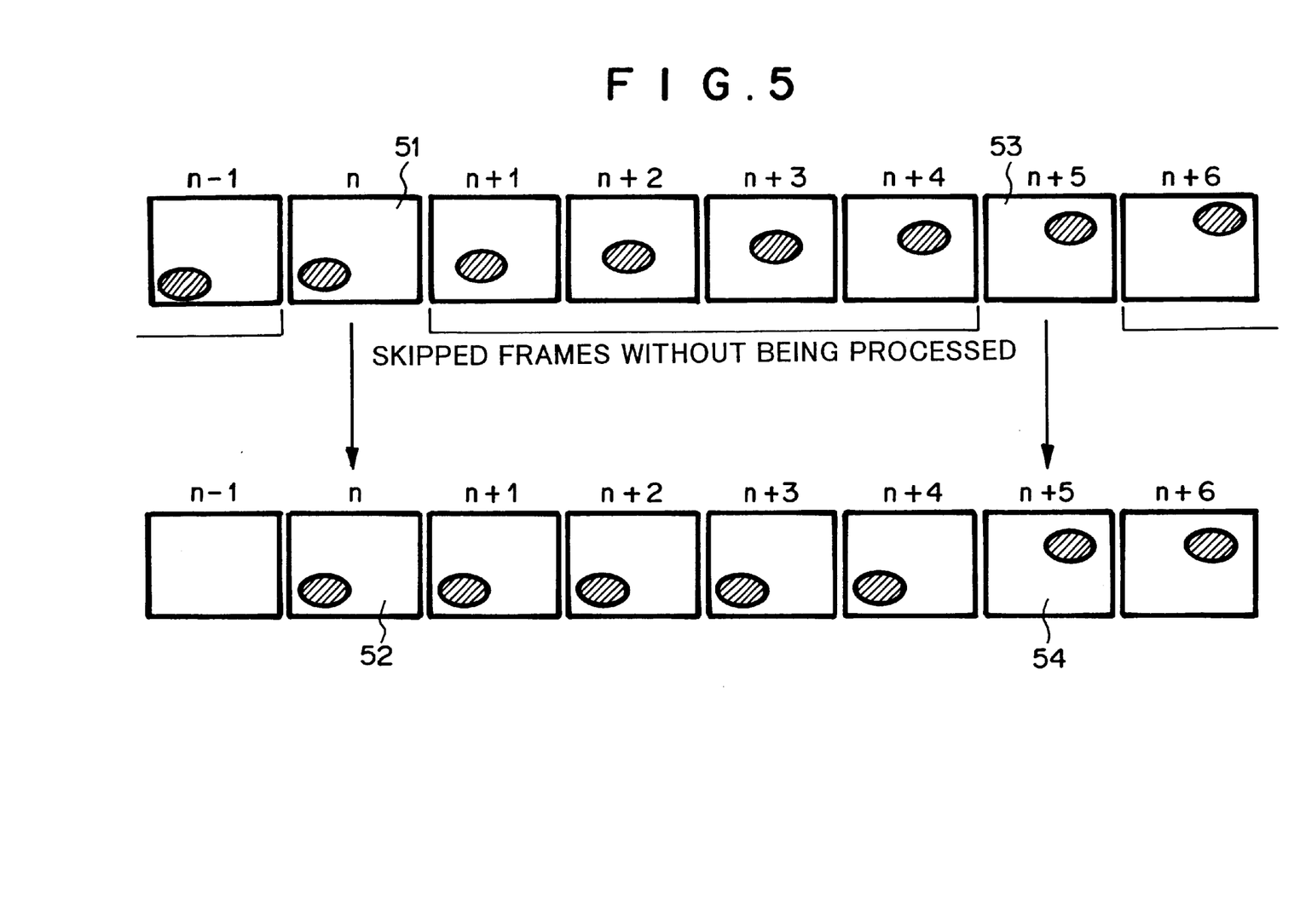
FIG. 5 is a diagram of a case where input pictures of 30 frames per second are compressed to those of 6 frames per second.

FIG. 5 schematically shows video data which are inputted at a frame rate of 30 frames per second.

In the case of the transmission frame rate of 6 frames per second, after the video data of a picture 51 of an nth frame are compressed to obtain compressed data of a picture 52, the video data of a picture 53 of an (n+5)-th frame is compressed for the next time. Therefore, picture 52 of the n-th frame is continuously displayed during the period of five frames until picture 54 of the compressed data obtained by compressing the video data of the picture 53 of the (n+5)-th frame is reproduced.

In the case where the pictures are displayed at a frame rate of 30 frames per second, the conventional compression processing performs the data amount assignment to enhance the picture quality on the basis of the idea that "the data amount to be assigned to a portion which moves at a speed above a prescribed speed can be decreased because the details in such a highly moving portion cannot be recognized by the human eyes". However, in the case where the pictures are displayed at a frame rate of 6 frames per second, details of a moving portion can be recognized by the human eye because a display time per frame is long. Further, in the case of the videophone, a picture portion which moves in a monitor screen is usually a body of a person with whom a calling person is having a conversation, and the visual point of the calling person is deemed to be concentrated on the conversation partner at all times.

Accordingly, in order to enhance the picture quality in the videophone, it is necessary to enhance the picture quality of the picture portions which users gaze, and particularly the picture quality of moving portions. In the following explanation, the enhancement in picture quality when the frame rate is low, particularly the enhancement in picture quality of moving picture portions will be explained.

When the interval between the reference frame and the current frame is larger than a threshold, the processing of enhancing the quality of the picture portion which moves at a speed above a prescribed speed is performed. This threshold is a reference value subjected to a comparison with a number of frames which are not processed, or with a time period in which frames are not processed. First, a moving picture portion is detected to enhance the picture quality. In order to detect particularly a picture portion which moves greatly, the moving distance of the block is determined by referring to the motion search result.

Figure 6A:
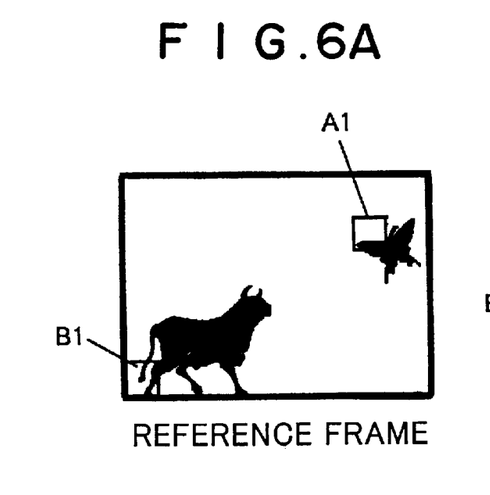
FIGS. 6A and 6B are diagrams showing a movement amount detected by a motion searching operation.
Figure 6B:
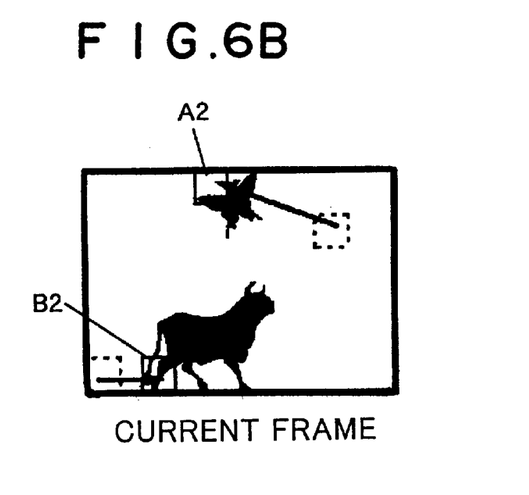

FIG. 6 shows the movement amount obtained by the motion search. It is assumed that on the basis of the motion search result, blocks A1 and B1 of the reference frame as shown in FIG. 6A moves to blocks A2 and B2 of the current frame as shown in FIG. 6B. In this ca se, it is also assumed that as a comparison result between each moving amount and the threshold value, the moving amount from A1 to A2 is larger than the threshold value, but the moving amount from B1 to B2 is smaller than the threshold value. In this case, it is judged that the portion moving from block A1 to block A2 is a part of a mobile body to which the visual point is directed, and the portion is set to be compressed in the high picture quality mode (steps 32, 33, 35 of FIG. 3). On the other hand, the movement from block B1 to block B2 is short, but these blocks may have a large information a mount. Therefore, the distribution of the high frequency components of these blocks which serves as an index representing the fineness of the pictures of the blocks is examined. The index of the high frequency components is generally determined by calculating the average value of the pixels in the block and then calculating the square-sum or absolute-value-sum of the differential value between each pixel and the average value.

If the value of the high frequency components of the block thus obtained is larger than the threshold value, the block is regarded as having detailed information, and thus it is set to be compressed in the high picture-quality mode. If not so, the block is set to be compressed in the normal mode (steps 33, 34, 35 of FIG. 3).

When the block type (hereinafter referred to as "compression mode") has been set to all the blocks, the data amount assigned to each frame is distributed to each block by referring to the compression mode.

Figure 7A:
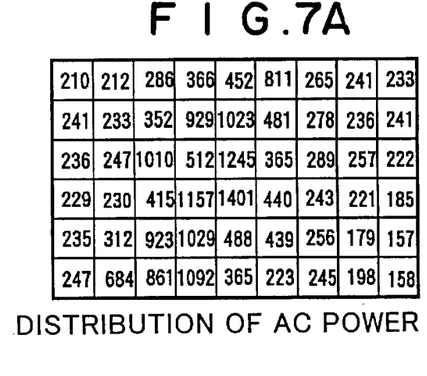
FIGS. 7A to 7D are diagrams showing a distribution method of data amount according to the embodiment of the present invention.
Figure 7B:
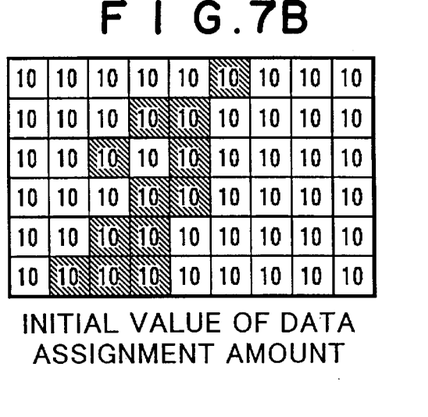

FIGS. 7A to 7D show an example of the distribution method of the data amount. FIG. 7A is an AC power distribution every block, and FIG. 7B is a diagram showing a case where data amount is equally distributed to blocks of one frame. In FIG. 7B, a hatched portion shows a block in the high picture quality mode, and a numerical value represents an assigned data amount.

Figure 7C:
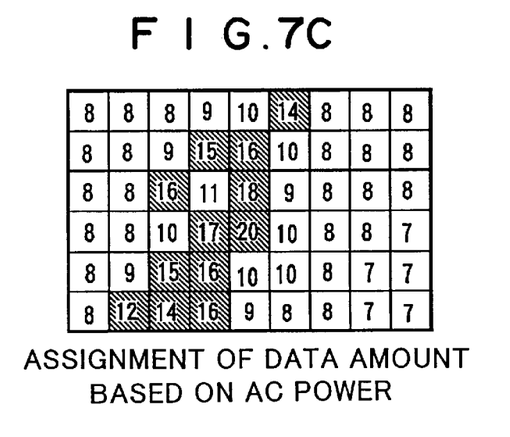
Figure 7D:
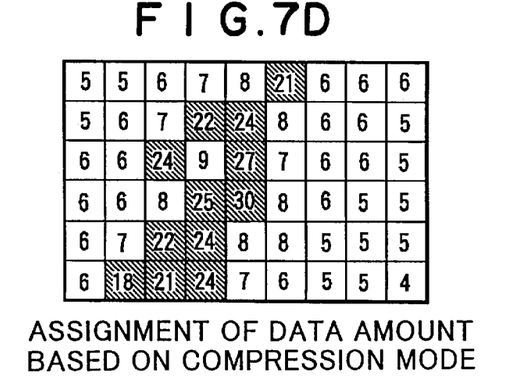

FIG. 7C shows a data amount assignment distribution in a case where a larger data amount is assigned to a block having larger AC power while a smaller data amount is assigned to a block having smaller AC power on the basis of the frequency distribution shown in FIG. 7A. FIG. 7D shows a case where the data amount is re-assigned according to the compression mode of the respective blocks so that the data amount of 1.5 times is further assigned to the blocks in the high picture-quality mode while the residual data amount is assigned to the blocks in the normal mode. Data amount assigning means 23 adjusts the quantization scale factor so as to establish the above data amount assignment, and supplies the quantization scale factor to quantizing means 24 to perform quantization.

Figure 8A:
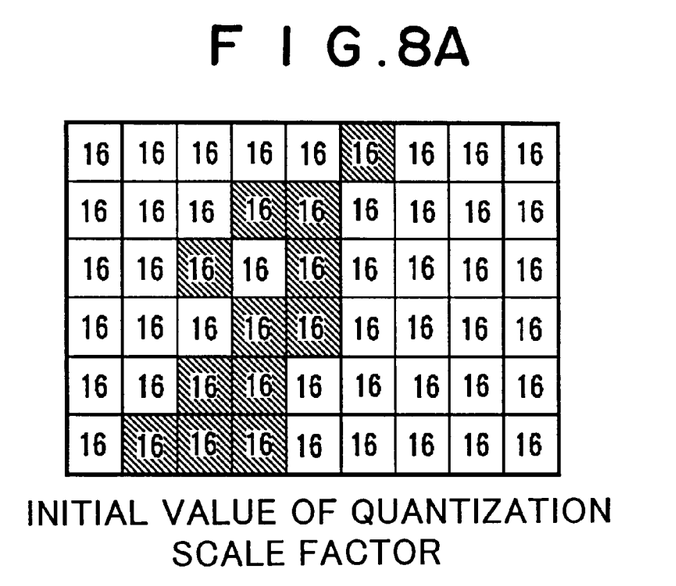
FIGS. 8A and 8B are diagrams showing a method of adjusting quantization scale factor.
Figure 8B:
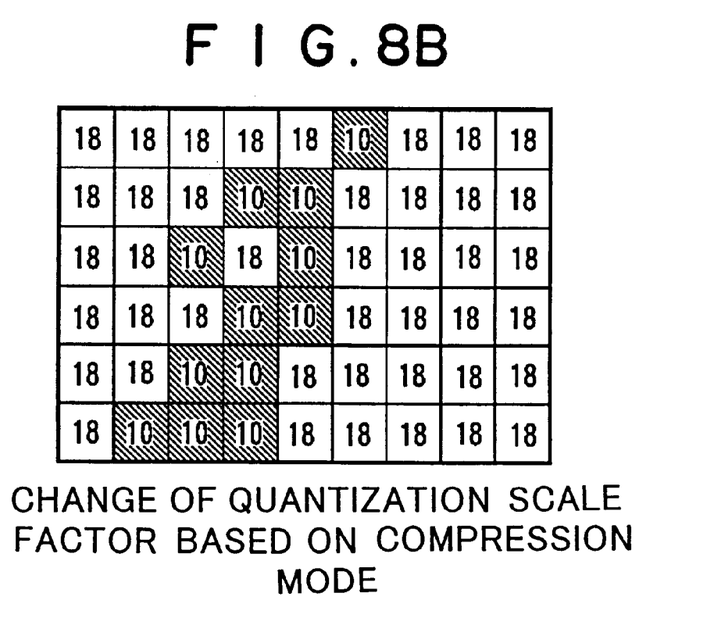

The quantization scale factor may be adjusted in the quantization step without taking account of the data amount to be assigned to each block. The method of this case will be explained with reference to FIG. 8.

In FIG. 8A, blocks in the high picture-quality mode are hatched, and the numerical values represent quantization scale factors. Normally, the quantization scale factors have values from 1 to 31, and more roughly quantization is performed as the quantization scale factor is larger. As shown in FIG. 8B, the blocks in the high picture-quality mode are quantized more finely than predetermined fineness, and the blocks in the normal mode are quantized more roughly, thereby enhancing the picture quality of conspicuous portions.

Further, in order to enhance the picture quality of the blocks in the high picture-quality mode, there may be adapted another method of further assigning a larger data amount to the blocks in the high picture-quality mode to compress these blocks using data of the current frame directly instead of using differential data between the current frame and the reference frame, and assigning the residual data amount to the blocks in the normal mode.

The present invention is not limited to the above-explained mode and the above example, and various modifications may be made. For example, even when one of motion vector judgement means 222 and frequency component means 223 is omitted, the picture-quality enhancing effect can be achieved to some degree.

As explained above, according to the present invention, when the frame rate is low, the data amount is more preferentially assigned to a picture portion which moves greatly or a picture portion having a fine picture, and then these picture portions are compressed. Therefore, the picture quality of picture portions which viewers gaze can be enhanced. Further, according to the present invention, only the assignment of the data amount in the compression processing is changed, so that the compression processing can be implemented without making no change to the apparatus at the reproduction side.

What is claimed is:

1. A picture encoding apparatus for performing motion-compensated intra-frame picture coding on a block basis, which comprises:

block data generating means for generating data of each block in a current frame from data in the current frame and data in a reference frame, and a motion vector for each block by using motion-compensated prediction;

a quantizer for quantizing data of each block in the current frame in accordance with a quantization scale factor;

block type determining means for determining whether a mode of each block in the current frame is high-quality mode or normal mode on the basis of an interval between the current frame and the reference frame, a quantity of the motion vector of each block in the current frame, and an activity of each block in the current frame;

data amount assignment means for determining the quantization scale factor for each block in the current frame on the basis of the mode of each block so that data amount of the output of said quantizer for each block is varied in accordance with the mode of each block; and variable-length encoding means for encoding the output of said quantizer into variable-length code; and reference frame data generating means for generating the data in the reference frame using the output of said quantizer.

2. The picture encoding apparatus as set forth in claim 1, wherein said block type determining means determines that the mode of each block in the current frame is the normal mode in case that the interval between the current frame and the reference frame is equal to or shorter than a first threshold, the mode is the high-quality mode in case that the interval is longer than the first threshold while the quantity of the motion vector is greater than a second threshold or the activity is greater than a third threshold, and the mode is the normal mode in case that the interval is longer than the first threshold while the quantity of the motion vector is equal to or less than the second threshold and the activity is equal to or less than the third threshold.

3. The picture encoding apparatus as set forth in claim 1, wherein said data amount assignment means distributes data amount assigned to the current frame to blocks in the current frame in accordance with activity distribution, increases data amount for blocks in the high-quality mode while summing up the increased data amount, and decreases data amount for blocks in the normal mode in accordance with the increased data amount summed up.

4. The picture encoding apparatus as set forth in claim 1, which further comprises converting means for converting the data of each block in a space domain to data in a frequency domain, and wherein said reference frame data generating means comprises inverse-converting means for inversely-converting the data in the frequency domain to data in the space domain.

5. A picture encoding apparatus for performing motion-compensated intra-frame picture coding on a block basis, which comprises:

block data generating means for generating data of each block in a current frame from data in the current frame and data in a reference frame, and a motion vector for each block by using motion-compensated prediction;

a quantizer for quantizing data of each block in the current frame in accordance with a quantization scale factor;

block type determining means for determining whether a mode of each block in the current frame is high-quality mode or normal mode on the basis of an interval between the current frame and the reference frame, and a quantity of the motion vector of each block in the current frame;

data amount assignment: means for determining the quantization scale factor for each block in the current frame on the basis of the mode of each block so that data amount of the output of said quantizer for each block is varied in accordance with the mode of each block; and variable-length encoding means for encoding the output of said quantizer into variable-length code; and reference frame data generating means for generating the data in the reference frame using the output of said quantizer.

6. The picture encoding apparatus as set forth in claim 5, wherein said block type determining means determines that the mode of each block in the current frame is the normal mode in case that the interval between the current frame and the reference frame is equal to or shorter than a first threshold, the mode is the high-quality mode in case that the interval is longer than the first threshold while the quantity of the motion vector is greater than a second threshold, and the mode is the normal mode in case that the interval is longer than the first threshold while the quantity of the motion vector is equal to or less than the second threshold.

7. The picture encoding apparatus as set forth in claim 5, wherein said data amount assignment means distributes data amount assigned to the current frame to blocks in the current frame in accordance with activity distribution, increases data amount for blocks in the high-quality mode while summing up the increased data amount, and decreases data amount for blocks in the normal mode in accordance with the increased data amount summed up.

8. The picture encoding apparatus as set forth in claim 5, which further comprises converting means for converting the data of each block in a space domain to data in a frequency domain, and wherein said reference frame data generating means comprises inverse-converting means for inversely-converting the data in the frequency domain to data in the space domain.

9. A picture encoding apparatus for performing motion-compensated intra-frame picture coding on a block basis, which comprises:

block data generating means for generating data of each block in a current frame from data in the current frame and data in a reference frame, and a motion vector for each block by using motion-compensated prediction;

a quantizer for quantizing data of each block in the current frame in accordance with a quantization scale factor;

block type determining means for determining whether a mode of each block in the current frame is high-quality mode or normal mode on the basis of an interval between the current frame and the reference frame, and an activity of each block in the current frame;

data amount assignment means for determining the quantization scale factor for each block in the current frame on the basis of the mode of each block so that data amount of the output of said quantizer for each block is varied in accordance with the mode of each block; and variable-length encoding means for encoding the output of said quantizer into variable-length code; and reference frame data generating means for generating the data in the reference frame using the output of said quantizer.

10. The picture encoding apparatus as set forth in claim 9, wherein said block type determining means determines that the mode of each block in the current frame is the normal mode in case that the interval between the current frame and the reference frame is equal to or shorter than a first threshold, the mode is the high-quality mode in case that the interval is longer than the first threshold while the activity is greater than a second threshold, and the mode is the normal mode in case that the interval is longer than the first threshold while the activity is equal to or less than the second threshold.

11. The picture encoding apparatus as set forth in claim 9, wherein said data amount assignment means distributes data amount assigned to the current frame to blocks in the current frame in accordance with activity distribution, increases, data amount for blocks in the high-quality mode while summing up the increased data amount, and decreases data amount for blocks in the normal mode in accordance with the increased data amount summed up.

12. The picture encoding apparatus as set forth in claim 9, which further comprises converting means for converting the data of each block in a space domain to data in a frequency domain, and wherein said reference frame data generating means comprises inverse-converting means for inversely-converting the data in the frequency domain to data in the space domain.

* * * * *